July 21, 1959     J. ARCH, JR     2,895,346

CONTACT GOVERNOR

Filed Nov. 8, 1957

JOHN ARCH, JR.
INVENTOR

BY *CA Snow & Co.*

ATTORNEYS.

2,895,346
CONTACT GOVERNOR
John Arch, Jr., Bryte, Calif.

Application November 8, 1957, Serial No. 695,425

1 Claim. (Cl. 74—526)

This invention relates to a contact governor, and has particular applicability to a governor for limiting the speed of vehicles, operated by direct contact of the accelerator pedal thereagainst.

An additional object of the invention is the provision of a device of this character which comprises a leaf spring fixed adjacent the underside of the accelerator, normally limiting the downward movement of the accelerator and, consequently, limiting the speed of the vehicle.

A further object of the invention is the provision of such a device which includes a yieldable leaf spring, which may, in emergencies, be additionally depressed to allow extra speed.

Still another object of the invention resides in the provision of a device of this character which may be readily adjusted for various speeds by means of a knob positioned on the dashboard.

An additional object of the invention is the provision of a device of this character which is sturdy and durable in construction, reliable and efficient in operation, and relatively simple and inexpensive to manufacture, assemble, and install.

Still other objects reside in the combinations of elements, arrangements of parts, and features of construction, all as will be more fully pointed out hereinafter, and shown in the accompanying drawing, wherein there is disclosed a preferred embodiment of this inventive concept.

Other objects will in part be obvious and in part be pointed out hereinafter and shown in the accompanying drawing, wherein.

Similar reference characters refer to similar parts throughout the several views of the drawing.

Figure 1:
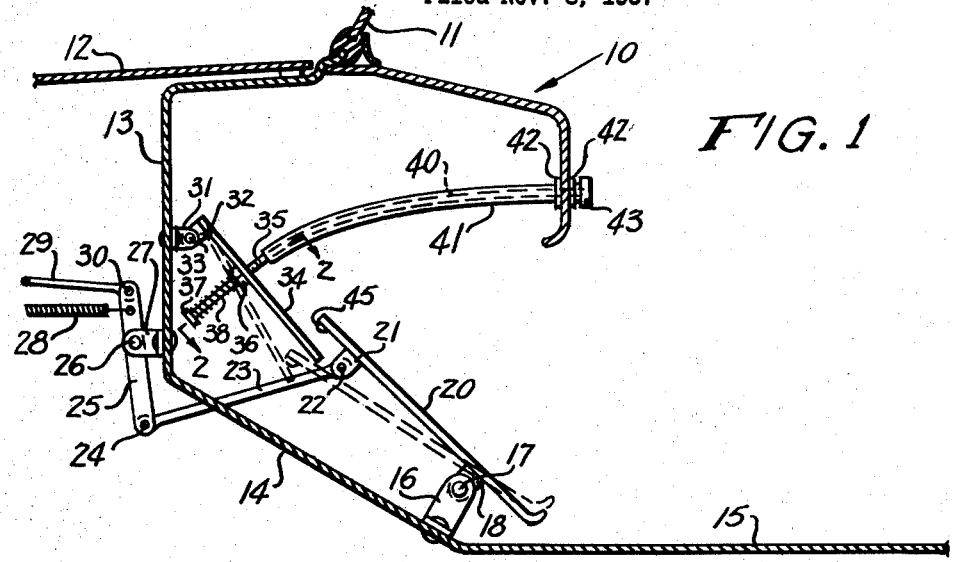
Figure 1 is a vertical sectional view, partially schematic, taken through the center line of a motor vehicle, showing the dash and floor boards in section, and disclosing the accelerator pedal and the contact governor of the instant invention, in association therewith.

Having reference now to the drawing in detail, there is generally indicated at 10 the dashboard of an automobile, of conventional design, upon which is mounted a windshield 11, a fragment of a hood 12 also being shown, all in section. The forward wall 13 of the vehicle merges into an inclined portion 14, of the floor boards 15. A pair of upwardly projecting lugs 16 have pivotally connected therebetween, as on the pivot 17, a depending lug 18 extending beneath an accelerator pedal 20. The accelerator foot pedal 20 is also provided with a lug 21, to which is pivotally connected as by means of a pivot 22 a link 23, which extends through a suitable aperture in the inclined portion 14 of the floor boards.

The other end of the link 23 is pivotally connected, as by pivot 24, to a second link 25, which is pivoted as on a pivot 26, at a point intermediate its length between the pair of lugs 27, secured interiorly of the hood to the forward portion of the front wall 13. A spring 28 serves to bias link 25 forwardly, and hence accelerator foot pedal 20 upwardly to idling position. A suitable lever 29 extends from a pivot 30 at the top of lever 29 forwardly to the carburetor, for the purpose of controlling the admission of fuel thereto, all of the above elements being of conventional nature.

Secured to the front wall of the vehicle at a point aligned with the accelerator pedal are a pair of lugs 31, between which is fixed a lug 32, on a pivot 33. The lug 32 has secured thereto a relatively stiff leaf spring 34, the end of which is adapted to extend beneath the end of the accelerator pedal 20. Leaf spring 34 is provided with a central aperture, through which extends a threaded member 35, which extends through a nut 36 on the underside of spring 34. The threaded member terminates in a head 37, and a spring 38 surrounds that portion of the threaded end extending beyond the nut 36.

Figure 2:
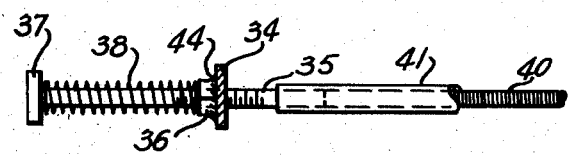
Fig. 2 is an enlarged sectional view taken substantially along the line 2—2 of Figure 1, as viewed in the direction indicated by the arrows.

As best shown in Fig. 2, the screw 35 is secured to one end of a flexible cable 40, which extends through a tube 41 of flexible material. The flexible tube extends through the dashboard 10, being secured in position by lock nuts 42 or the like, and terminates in an adjusting knob 43. As best shown in Fig. 2, the adjusting nut 36 is secured to the underside of leaf spring 34, in any desired manner, as by welding 44 or the like.

The underside of the accelerator foot pedal 20 is provided with a button 45, or the like, which is adapted, when the accelerator is depressed to a desired interval, to contact the end of the leaf spring 34.

From the foregoing, the purpose and function of the device should now be readily understood. Rotation of the knob 43 results in the rotation of threaded member 35, which varies the position of the leaf spring 34, relative to the button 45 of the accelerator pedal 20. When the accelerator pedal 20 is depressed to contacting position with the spring 34, the maximum adjusted speed has been reached. Obviously, the selected speed may be varied, or compensated for, by rotation of the knob 43.

However, the spring 34, while being relatively stiff, is also yieldable, so that in emergencies extra pressure upon the foot accelerator 20 will result in downward bending of the spring, to permit added speed for emergency usage. However, since this requires physical exertion, the tendency is not to exert such pressure except when absolutely necessary, and accordingly, the speed of the vehicle is normally maintained at its proper adjusted speed.

From the foregoing, it will now be seen that there is herein provided an improved contact accelerator, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

In a contact governor for regulating the speed of vehicles controlled by foot depressible accelerator pedals, a leaf spring connected at one end to the front body wall of the vehicle, the other end being free and extending beneath the free end of said accelerator pedal, and means for varying the position of the free end of said leaf spring relative to said accelerator pedal, said last mentioned means being controlled by a knob on the dashboard of said vehicle, said leaf spring having an aperture therethrough, a threaded nut aligned with said aperture, a threaded bolt extending through said nut, a flexible cable rotatably connecting said bolt to said knob, said bolt extending beyond said nut and terminating in a head, and a compression spring between said head and said nut.

References Cited in the file of this patent
UNITED STATES PATENTS

| | | |
|---|---|---|
| 2,165,897 | Liley | July 11, 1939 |
| 2,336,447 | Campbell | Dec. 7, 1943 |
| 2,567,529 | Schetzer | Sept. 11, 1951 |
| 2,776,581 | Hamlin | Jan. 8, 1957 |